(12) United States Patent
Fan

(10) Patent No.: US 9,618,686 B2
(45) Date of Patent: Apr. 11, 2017

(54) LASER BACKLIGHT LAMP ASSEMBLY, BACKLIGHT MODULE AND DISPLAY DEVICE

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 87 days.

(21) Appl. No.: 14/762,864

(22) PCT Filed: Apr. 22, 2015

(86) PCT No.: PCT/CN2015/077158
§ 371 (c)(1),
(2) Date: Jul. 23, 2015

(87) PCT Pub. No.: WO2016/155054
PCT Pub. Date: Oct. 6, 2016

(65) Prior Publication Data
US 2017/0038520 A1 Feb. 9, 2017

(30) Foreign Application Priority Data
Apr. 2, 2015 (CN) .......................... 2015 1 0154234

(51) Int. Cl.
| | | |
|---|---|---|
| *G02F 1/1335* | (2006.01) | |
| *F21V 8/00* | (2006.01) | |
| *F21V 29/70* | (2015.01) | |
| *F21Y 115/10* | (2016.01) | |
| *F21Y 115/30* | (2016.01) | |

(52) U.S. Cl.
CPC ............ *G02B 6/0068* (2013.01); *F21V 29/70* (2015.01); *G02B 6/002* (2013.01); *G02B 6/009* (2013.01); *G02B 6/0073* (2013.01); *G02B 6/0076* (2013.01); *G02B 6/0085* (2013.01); *F21Y 2115/10* (2016.08); *F21Y 2115/30* (2016.08)

(58) Field of Classification Search
CPC ........................... G02B 6/0091; G02B 6/0068
See application file for complete search history.

(56) References Cited

U.S. PATENT DOCUMENTS

| | | | | |
|---|---|---|---|---|
| 2007/0205712 | A1* | 9/2007 | Radkov | .............. C09K 11/0838 313/503 |
| 2009/0020775 | A1* | 1/2009 | Radkov | ................ C09K 11/675 257/98 |
| 2015/0295153 | A1* | 10/2015 | Kuramoto | ............... H01L 24/29 257/98 |

* cited by examiner

*Primary Examiner* — Elmito Breval
(74) *Attorney, Agent, or Firm* — Andrew C. Cheng

(57) ABSTRACT

The present invention provides a laser backlight lamp assembly, having a LED light bar and a laser light bar at one side of the LED light bar, and a laser light source of the laser light bar is a green laser light diode; a LED lamp of the LED light bar has a base, a heat sinker installed in the base, a blue light lampwick fixed on the heat sinker and a light housing, and colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps. The present invention further provides a backlight module and a display device.

14 Claims, 3 Drawing Sheets

LASER BACKLIGHT LAMP ASSEMBLY, BACKLIGHT MODULE AND DISPLAY DEVICE

CROSS REFERENCE

This application claims the priority of Chinese Patent Application No. 201510154234.6, entitled "Laser backlight lamp assembly, backlight module and display device", filed on Apr. 2, 2015, the disclosure of which is incorporated herein by reference in its entirety.

FIELD OF THE INVENTION

The present invention relates to a display skill field, and more particularly to a laser backlight lamp assembly, a backlight module and a display device.

BACKGROUND OF THE INVENTION

At present, a liquid crystal display device as being the display component of the electronic device has been widely applied in various kinds of electronic products. With the lightening development of the electronic products, the thickness of the liquid crystal display device becomes smaller and smaller, too. The backlight module is an important component in the liquid crystal display device.

In prior art, along with that the development of the liquid crystal TVs is directed toward large scale and high color saturation, for achieving better color saturation of the displays, and letting the people to sense abundant visual experience, laser light sources are introduced as being a kind of backlight source in the backlight of the liquid crystal display in recent years. In present laser backlight sources, mainly, the blue chip+green light phosphor LED (i.e. B+G phosphor LED) is utilized. With such back light in cooperation with a normal liquid crystal display screen, the color gamut is generally smaller than 100% NTSC color gamut. For reaching higher colorful expression and realizing higher color cover area, some has tried to utilize RGB three color lasers for attempting the achievement of high color saturation. However, the cost the RGB three color lasers is high, and the color is not easy to control. The color shift can easily occur.

SUMMARY OF THE INVENTION

The embodiment of the present invention provides a laser backlight lamp assembly.

The present invention further provides a backlight module and a display device.

The present invention provides a laser backlight lamp assembly, comprising a LED light bar and a laser light bar at one side of the LED light bar, and a laser light source of the laser light bar is a green laser light diode; a LED lamp of the LED light bar comprises a base, a heat sinker installed in the base, a blue light lampwick fixed on the heat sinker and a light housing, and colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps.

A blue light peak wavelength of the blue light lampwick is 440-465 nm, and a full-width at half maximum is 15-25 nm; a highest peak wavelength of the red light generated by the fluoride red phosphor is 625-635 nm, and a full-width at half maximum is 3-6 nm.

A green light wavelength of the green laser light is 515-535 nm, and a full-width at half maximum is 2-6 nm.

The fluoride red phosphor is one of $K_2TiF_6:Mn^{4+}$, $K_2SiF_6:Mn^{4+}$, $K_2SnF_6:Mn^{4+}$, $K_2GeF_6:Mn^{4+}$, $K_2ZrF_6:Mn^{4+}$, $K_2GdF_5:Eu^{3+}$.

The present invention further provides a backlight module, and the backlight module the backlight module comprises a glue frame, a light guide plate and a laser backlight lamp assembly accommodated in the glue frame, and the laser backlight lamp assembly comprises a LED light bar and a laser light bar at one side of the LED light bar, and a laser light source of the laser light bar is a green laser light diode; a LED lamp of the LED light bar comprises a base, a heat sinker installed in the base, a blue light lampwick fixed on the heat sinker and a light housing, and colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps.

The light guide plate comprises a first incident surface and a second incident surface adjacent to the first incident surface, and the laser light sources of the laser light bar and the first incident surface are oppositely positioned, and the light sources of the laser light bar and the second incident surface are oppositely positioned.

The light guide plate comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate.

The light guide plate comprises a first layer and a second layer, and the first layer and the second layer are oppositely positioned in parallel, and the laser light sources of the laser light bar and an incident surface of the first layer are oppositely positioned, and the light sources of the LED light bar and an incident surface of the second layer are oppositely positioned; or the laser light sources of the laser light bar and an incident surface of the second layer are oppositely positioned, and the light sources of the LED light bar and an incident surface of the first layer are oppositely positioned; the incident surface of the first layer and the incident surface of the second layer are two adjacent positioned surfaces.

The light guide plate is a rectangular plate body, further comprising two adjacent non incident surfaces, and heat expansion directions of the light guide plate are directions of the non incident surfaces.

The present invention further provides a display device, comprising a display panel and the backlight module.

The LED lamps 131 of the backlight module according to the present invention are achieved by utilizing higher conversion efficiency blue+fluoride phosphor LED. With higher conversion efficiency and the higher achievable depth of color saturation, the green laser light source is simultaneously utilized, only laser of one color is used. Not only the NTSC color gamut is close to RGB three color lasers but also the higher energy conversion efficiency can be achieved. The backlight power consumption can be saved and the electrical energy is saved accordingly.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
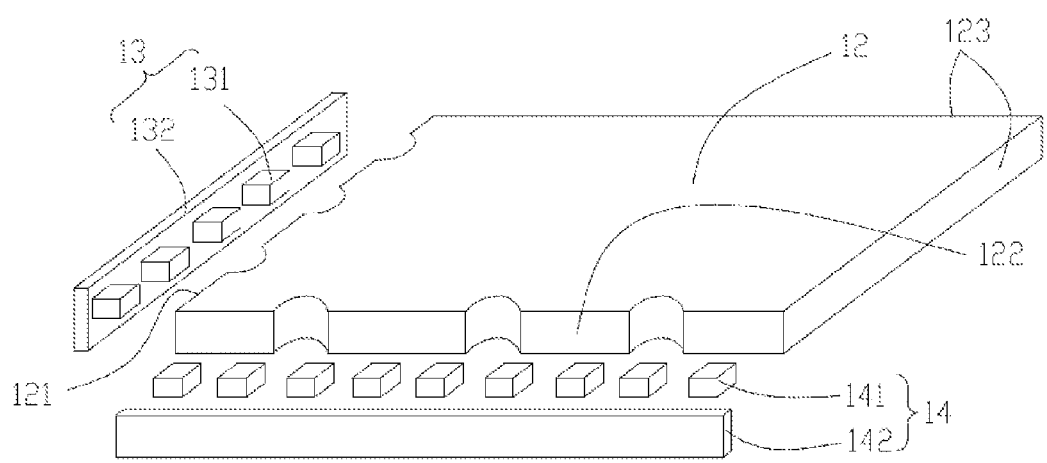
FIG. 1 is a structural diagram of a laser backlight lamp assembly and a backlight module according to the present invention.
Figure 2:
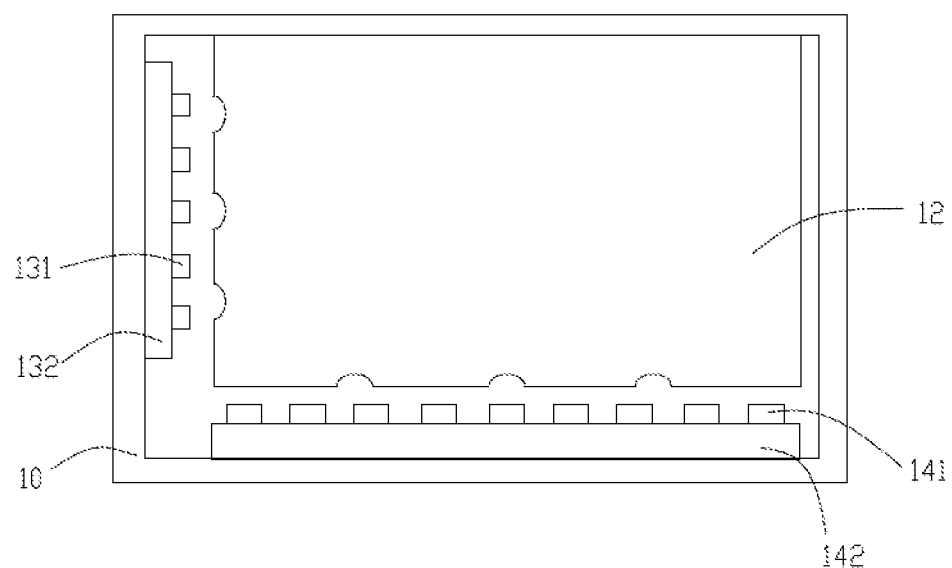
FIG. 2 is a top view diagram of the backlight module shown in FIG. 1.

Please refer to FIG. 1 and FIG. 2. The preferred embodiment of the present invention provides a laser backlight lamp assembly and a backlight module, and the backlight module comprises a glue frame 10, a light guide plate 12 and a laser backlight lamp assembly. The light guide plate 12 and the laser backlight lamp assembly are accommodated in the glue frame 10.

Figure 3:
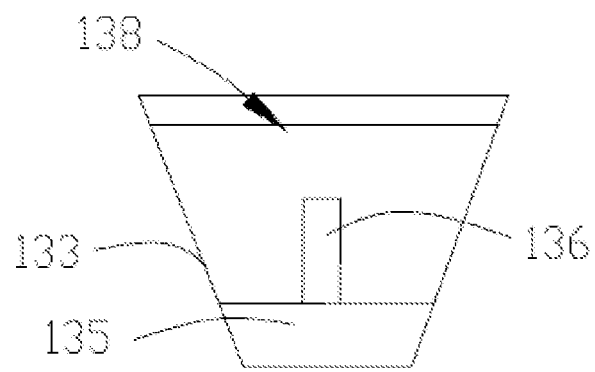
FIG. 3 is a structural diagram of a LED lamp of the backlight module shown in FIG. 1.

Please refer to FIG. 3. The laser backlight lamp assembly comprises a LED light bar 13 and a laser light bar 14 at one side of the LED light bar 13, and a laser light source 141 of the laser light bar 14 is a green laser light diode. A LED lamp 131 of the LED light bar 13 comprises a base 133, a heat sinker 135 installed in the base 133, a blue light lampwick 136 fixed on the heat sinker and a light housing (not shown). Colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps. The LED light bar 13 and the laser light bar 14 are located at two adjacent sides of the light guide plate 12.

In this embodiment, the laser light bar 14 further comprises an Aluminum substrate 142 and a plurality of laser light sources 141 installed on the Aluminum substrate 142. The LED light bar 13 further comprises an Aluminum substrate 132. A plurality of LED lamps 131 are installed on the Aluminum substrate 132. The colloid 138 containing fluoride red phosphor mainly is that transparent silica gel is employed to fix the colloid 138 containing fluoride red phosphor on the substrate 132. When the laser backlight lamp assembly provides back light for the backlight module, the LED light bar 13 and the laser light bar 14 illumine at the same time. The light source of the LED light bar 13 and the light source of the laser light bar 14 enter the light guide plate 12 at the same time. Because the conversion efficiency of the fluoride red phosphor is high, and the full-width at half maximum (FWHM) is small. The NTSC color gamut of the back light of the backlight module is lower than the RGB three color lasers back light with merely 5.5% to make the LED lamps possess higher conversion efficiency and the higher depth of color saturation can be achieved.

Furthermore, a blue light peak wavelength of the blue light lampwick 136 is 440-465 nm, and a full-width at half maximum is 15-25 nm; a highest peak wavelength of the red light generated by the fluoride red phosphor is 625-635 nm, and a full-width at half maximum is 3-6 nm. A green light wavelength of the green laser light source 141 is 515-535 nm, and a full-width at half maximum is 2-6 nm.

Furthermore, the fluoride red phosphor is one of $K_2TiF_6:Mn^{4+}$, $K_2SiF_6:Mn^{4+}$, $K_2SnF_6:Mn^{4+}$, $K_2GeF_6:Mn^{4+}$, $K_2ZrF_6:Mn^{4+}$, $K_2GdF_5:Eu^{3+}$.

In this embodiment, the light guide plate 12 comprises a first incident surface 121 and a second incident surface 122 adjacent to the first incident surface 121, and the LED light lamps 131 of the LED light bar 13 and the first incident surface 121 are oppositely positioned, and the laser light sources 141 of the laser light bar 14 and the second incident surface 122 are oppositely positioned. In this embodiment, the length of the first incident surface 121 of the light guide plate 12 is smaller than the length of the second incident surface 122. In other embodiments, the length of the first incident surface 121 of the light guide plate 12 is larger than the length of the second incident surface 122.

Furthermore, the light guide plate 12 comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate. In this embodiment, one light guide plate is involved to decrease the overall thickness of the backlight module.

The light guide plate 12 is a rectangular plate body, further comprising two adjacent non incident surfaces 123, and heat expansion directions of the light guide plate are directions of the non incident surfaces 123. In this embodiment, the four surfaces, the first incident surface 121, the second incident surface 122 and the two non incident surfaces 123 are four interconnected lateral sides. After the light source 131 and the laser light sources 141 irradiate the light guide plate, the light guide plate 12 is heated and deforms. In this embodiment, the heat volume change direction of the light guide plate 12 is away from the light source 131 and the laser light sources 141. Accordingly, the distance between the LED lamp 131 and the first incident surface 121 can be ensured, and meanwhile, the distance between the laser light sources 141 and the second incident surface 122 can be ensured, too. Consequently, the coupling distance of the light sources can be ensured to promote the light efficiency.

Figure 4:
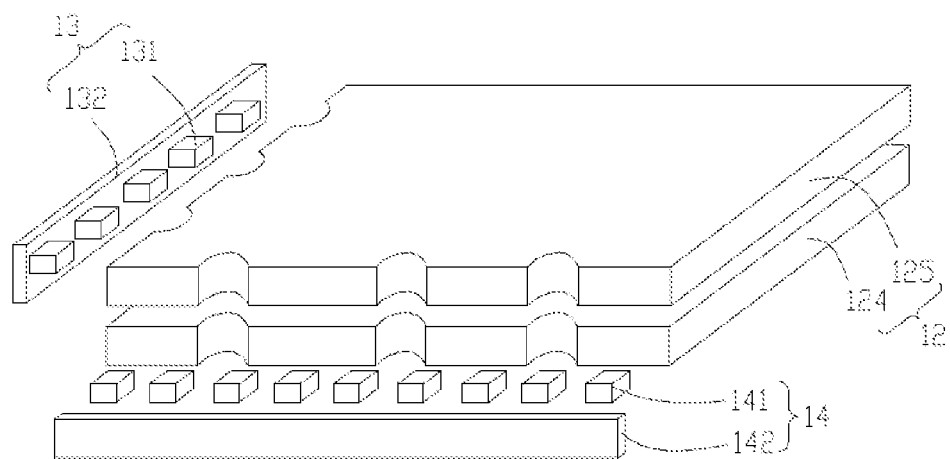
FIG. 4 is a structural diagram of a backlight module according to another embodiment of the present invention.

Please refer to FIG. 4. In another embodiment of the present invention, the difference from the aforesaid embodiment is: the light guide plate 12 comprises a first layer 124 and a second layer 125, and the first layer 124 and the second layer 125 are oppositely positioned in parallel, and the laser light sources of the laser light bar 14 and an incident surface of the first layer 124 are oppositely positioned, and the light sources of the LED light bar 13 and an incident surface of the second layer 125 are oppositely positioned; or the laser light sources of the laser light bar 14 and an incident surface of the second layer 125 are oppositely positioned, and the light sources of the LED light bar 13 and an incident surface of the first layer 124 are oppositely positioned.

The LED lamps 131 of the backlight module according to the present invention are achieved by utilizing higher conversion efficiency blue+fluoride phosphor LED and the green laser light source is simultaneously utilized, only laser of one color is used. Not only the NTSC color gamut is close to RGB three color lasers but also the higher energy conversion efficiency can be achieved. The backlight power consumption can be saved and the electrical energy is saved accordingly.

The present invention further provides a display device, comprising a display and the backlight module. The display panel is installed on the backlight module. The display device has a thinner backlight module.

Above are embodiments of the present invention, which does not limit the scope of the present invention. Any modifications, equivalent replacements or improvements within the spirit and principles of the embodiment described above should be covered by the protected scope of the invention.

What is claimed is:

1. A laser backlight lamp assembly, and the laser backlight lamp assembly comprises a LED light bar and a laser light bar at one side of the LED light bar, and a laser light source of the laser light bar is a green laser light diode; a LED lamp of the LED light bar comprises a base, a heat sinker installed in the base, a blue light lampwick fixed on the heat sinker and a light housing, and colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps.

2. The laser backlight lamp assembly according to claim 1, wherein a blue light peak wavelength of the blue light lampwick is 440-465 nm, and a full-width at half maximum is 15-25 nm; a highest peak wavelength of the red light generated by the fluoride red phosphor is 625-635 nm, and a full-width at half maximum is 3-6 nm.

3. The laser backlight lamp assembly according to claim 2, wherein a green light wavelength of the green laser light is 515-535 nm, and a full-width at half maximum is 2-6 nm.

4. The laser backlight lamp assembly according to claim 2, wherein the fluoride red phosphor is one of $K2TiF6:Mn^{4+}$, $K2SiF6:Mn^{4+}$, $K2SnF6:Mn^{4+}$, $K2GeF6:Mn^{4+}$, $K2ZrF6:Mn^{4+}$, $K2GdF5:Eu^{3+}$.

5. A backlight module, and the backlight module comprises a glue frame, a light guide plate and a laser backlight lamp assembly accommodated in the glue frame, the laser backlight lamp assembly comprises a LED light bar and a laser light bar at one side of the LED light bar, and a laser light source of the laser light bar is a green laser light diode; a LED lamp of the LED light bar comprises a base, a heat sinker installed in the base, a blue light lampwick fixed on the heat sinker and a light housing, and colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps; the LED light bar and the laser light bar are located at two adjacent sides of the light guide plate.

6. The backlight module according to claim 5, wherein the light guide plate comprises a first incident surface and a second incident surface adjacent to the first incident surface, and the laser light sources of the laser light bar and the first incident surface are oppositely positioned, and the light sources of the LED light bar and the second incident surface are oppositely positioned.

7. The backlight module according to claim 6, wherein the light guide plate is a rectangular plate body, further comprising two adjacent non incident surfaces, and heat expansion directions of the light guide plate are directions of the non incident surfaces.

8. The backlight module according to claim 6, wherein the light guide plate comprises mesh dots inside corresponding to the laser light sources; the light guide plate comprises mesh dots inside corresponding to the lights of the LED light sources; the mesh dots corresponding to the LED light source and the mesh dots corresponding to the laser light sources are on two parallel planes inside the light guide plate.

9. The backlight module according to claim 5, wherein the light guide plate comprises a first layer and a second layer, and the first layer and the second layer are oppositely positioned in parallel, and the laser light sources of the laser light bar and an incident surface of the first layer are oppositely positioned, and the light sources of the LED light bar and an incident surface of the second layer are oppositely positioned; or the laser light sources of the laser light bar and an incident surface of the second layer are oppositely positioned, and the light sources of the LED light bar and an incident surface of the first layer are oppositely positioned; the incident surface of the first layer and the incident surface of the second layer are two adjacent positioned surfaces.

10. A display device, comprising a display panel and a backlight module, wherein the backlight module comprises a glue frame, a light guide plate and a laser backlight lamp assembly accommodated in the glue frame, and the laser backlight lamp assembly comprises a LED light bar and a laser light bar at one side of the LED light bar, and a laser light source of the laser light bar is a green laser light diode; a LED lamp of the LED light bar comprises a base, a heat sinker installed in the base, a blue light lampwick fixed on the heat sinker and a light housing, and colloid containing fluoride red phosphor is filled inside the base, and the colloid covers the blue light lampwick, and the light housing covers the base and houses the colloid, and the laser light source of the laser light bar and the LED light bar illumine at the same time to be backlight lamps; the LED light bar and the laser light bar are located at two adjacent sides of the light guide plate.

11. The display device according to claim 10, wherein the light guide plate comprises a first incident surface and a second incident surface adjacent to the first incident surface, and the laser light sources of the laser light bar and the first incident surface are oppositely positioned, and the light sources of the LED light bar and the second incident surface are oppositely positioned.

12. The display device according to claim 11, wherein the light guide plate comprises mesh dots inside corresponding to the laser light sources; the light guide plate comprises mesh dots inside corresponding to the lights of the LED light sources; and the mesh dots corresponding to the LED light sources and the mesh dots corresponding to the laser light sources are on two parallel planes inside the light guide plate.

13. The display device according to claim 10, wherein the light guide plate comprises a first layer and a second layer, and the first layer and the second layer are oppositely positioned in parallel, and the laser light sources of the laser light bar and an incident surface of the first layer are oppositely positioned, and the light sources of the LED light bar and an incident surface of the second layer are oppositely positioned; or the laser light sources of the laser light bar and an incident surface of the second layer are oppositely positioned, and the light sources of the LED light bar and an incident surface of the first layer are oppositely positioned; the incident surface of the first layer and the incident surface of the second layer are two adjacent positioned surfaces.

14. The display device according to claim 11, wherein the light guide plate is a rectangular plate body, further comprising two adjacent non incident surfaces, and heat expansion directions of the light guide plate are directions of the non incident surfaces.

\* \* \* \* \*